Aug. 6, 1968 J. D. CALVERT 3,396,372

POLLING SYSTEM

Filed Dec. 29, 1965 2 Sheets-Sheet 1

INVENTOR
JAMES D. CALVERT

BY John A. Harvey

ATTORNEY

Aug. 6, 1968 J. D. CALVERT 3,396,372

POLLING SYSTEM

Filed Dec. 29, 1965 2 Sheets-Sheet 2

United States Patent Office
3,396,372
Patented Aug. 6, 1968

3,396,372
POLLING SYSTEM
James D. Calvert, Poughkeepsie, N.Y., assignor to International Business Machines Corporation, Armonk, N.Y., a corporation of New York
Filed Dec. 29, 1965, Ser. No. 517,361
13 Claims. (Cl. 340—172.5)

ABSTRACT OF THE DISCLOSURE

The disclosure is directed to a parallel polling system wherein a data receiving location concurrently polls all addresses assigned to all of a large number of data transmitting locations and, from the return replies of those requesting service, selects upon a priority basis the address of one to receive service. Polling selection is accomplished by successive address digit orders from a first order to a last order and priority selection for service is by preassigned geographic location identified within each address digit order. From return service request replies of the first order, first-ordered digit poll addressing of the transmitting locality of highest priority is continued and first-order digit poll addressing of all other transmitting localities is terminated. Poll digit address selection progresses in the same manner for the second and each successively higher digit order, each time priority selecting one locality for continued digit order polling and terminating polling in that digit order to all other localities. The highest-order priority selection ultimately continues order-selection polling of all address digits of only one transmitting locality, and it is this locality which receives service.

Figure 1A:
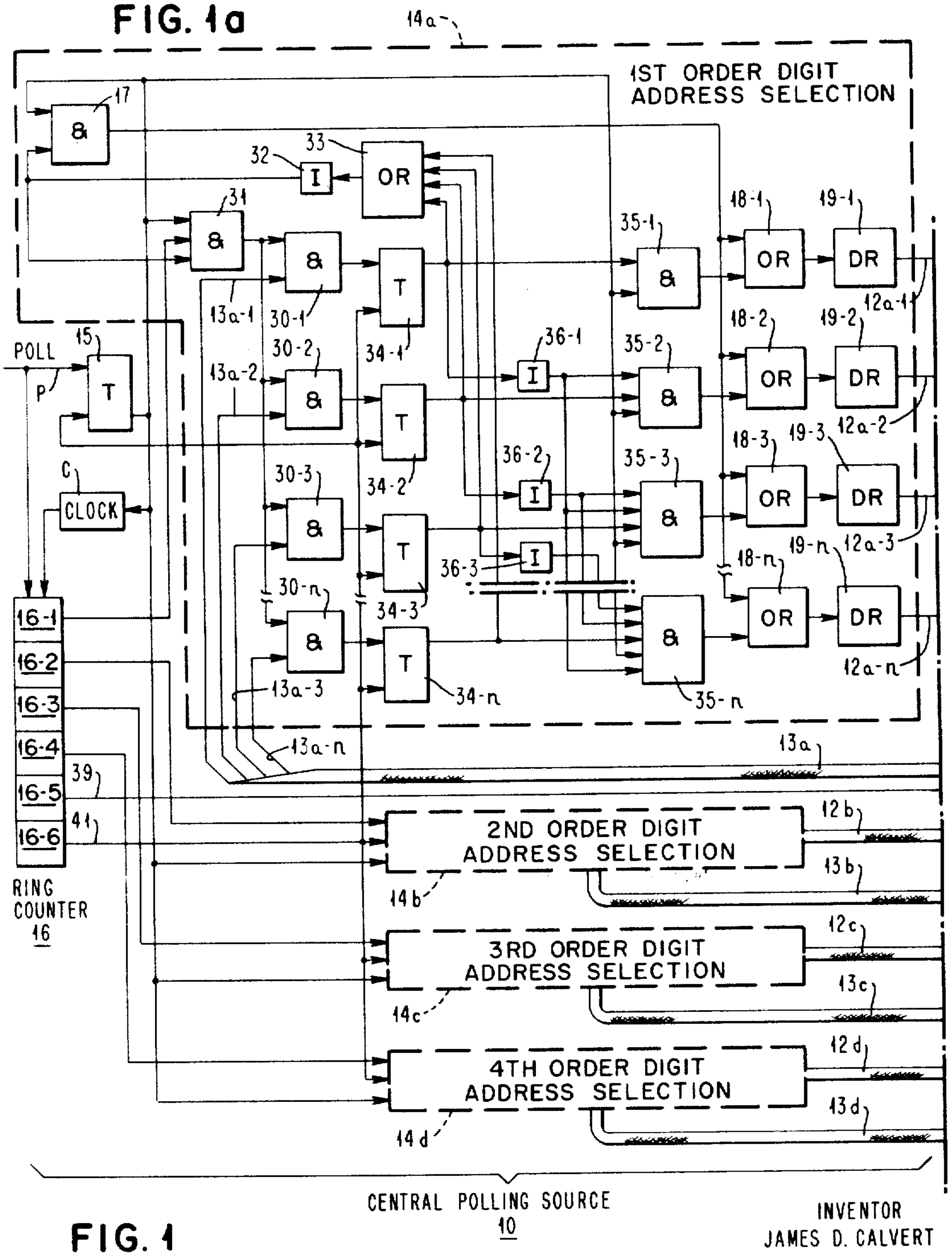

The present invention relates to polling systems for data input-output devices and, more particularly, to such systems for concurrent polling from a central location of all of plural outlying data input-output devices to ascertain those which are available to receive data from or transmit data to the central location.

Data processing systems often have one or more centrally located data processing equipments which collect for processing data originating at one or more remotely situated data input devices and which supply processed data to one or more remotely situated data output devices. The central data processing equipment conventionally includes a large capacity data storage unit operable at high operating speeds to receive words of data for storage or to supply words of data from storage for processing. On the other hand, data input devices conventionally operate at much slower rates to accumulate successive complete data words in readiness for transmission to the storage unit for storing, and data output devices likewise operate at lower rates to receive successive data words from the storage unit and record them serially by aliphanumeric character or symbol in such recording media as magnetic tapes, magnetic discs, or tabulating cards. When a data input device has so accumulated a data word in readiness for storage, it makes a request of the central data processing equipment for service to effect storage of the word and temporarily holds the word awaiting honor of its request by the central equipment. In similar manner, when a data output device has completed recording of a word it makes request of the central processing equipment for service to have a further word supplied to the output device for recording. Since the central processing equipment is common to all of the remote data input-output devices and often has access to them only through a single plural-conductor data translation channel used for reasons of economy, the input-output devices must time-share their access to the central equipment. At any given time, several (although rarely a majority) of the outlying input-output devices may often concurrently desire service. In such instances, certain of the input-output devices may well have greater importance than will others in the overall operation and should accordingly be available on a priority basis. Thus there is the problem in a data processing system having large numbers of outlying data input-output devices, some of which may or may not be operative at any given time, of ascertaining most expeditiously just which such devices are requesting service and of expeditiously extending service to the one of these devices having the prevailing highest priority.

In these large systems, selection of one input-output device from among a large number requesting service is conventionally accomplished by assigning an individual identifying address to each such device, and by then address-selecting from all devices requesting service the particular one to be serviced. While this method of selection minimizes the time required to select a device for service, it is undesirable from the standpoint of the high initial and maintenance costs occasioned by the extensive amount of hardware and the large numbers of intercoupling line conductors required to accomplish it. To simplify the hardware and line requirements, and thus avoid these cost disadvantages, it had been proposed that the outlying data input-output devices by assigned individual identification addresses by which they may be address-selected or polled, and by then polling the devices in succession to service them one after another in order from a first to a last device in the system. This method of serial polled selection is both time consuming and inefficient, in that all of the devices must be polled in succession even though a majority may not require service at the particular time of their polling. Although the serial method of polling reduces somewhat the hardware and line requirements for its accomplishment, nevertheless the system required more hardware for selection logic than is desirable and does not readily permit shared use of lines for polling and data transmission or control or other purposes.

It is an object of the present invention to provide a new and improved polling system for data input-output devices, and one which minimizes the complexity of polling equipment and the number of line conductors required to effect rapid priority selection of each input-output device for servicing.

It is a further object of the invention to provide a novel data input-output device polling system which permits faster polled selection of an individual input-output device than is available in the successive or serial method of polling the devices, yet substantially reduces the hardware and line complexity required for direct address selection of a particular one of plural devices concurrently registering requests for service.

It is an additional object of the invention to provide a polling system for data input-output devices which is readily adapted to expansion or contraction of system size by modular steps according to the prevailing nature and size of the central data processing equipment and the prevailing number of data input-output devices employed in each particular application.

It is yet a further object of the invention to provide a data input-output device polling system which allows a high degree of flexibility in choice of the relative balance as between the amount of polling hardware used at the central data processing location and that used at each input-output device and the choice of the number of address lines selected for each system installation.

It is a further object of the invention to provide a novel polling system for data input-output devices wherein all devices are concurrently polled and rapid selection of one device for servicing is made with insignificant time dependence upon the number of devices employed in a particular application.

Figure 1:
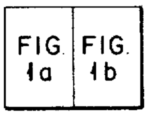
Figure 1B:
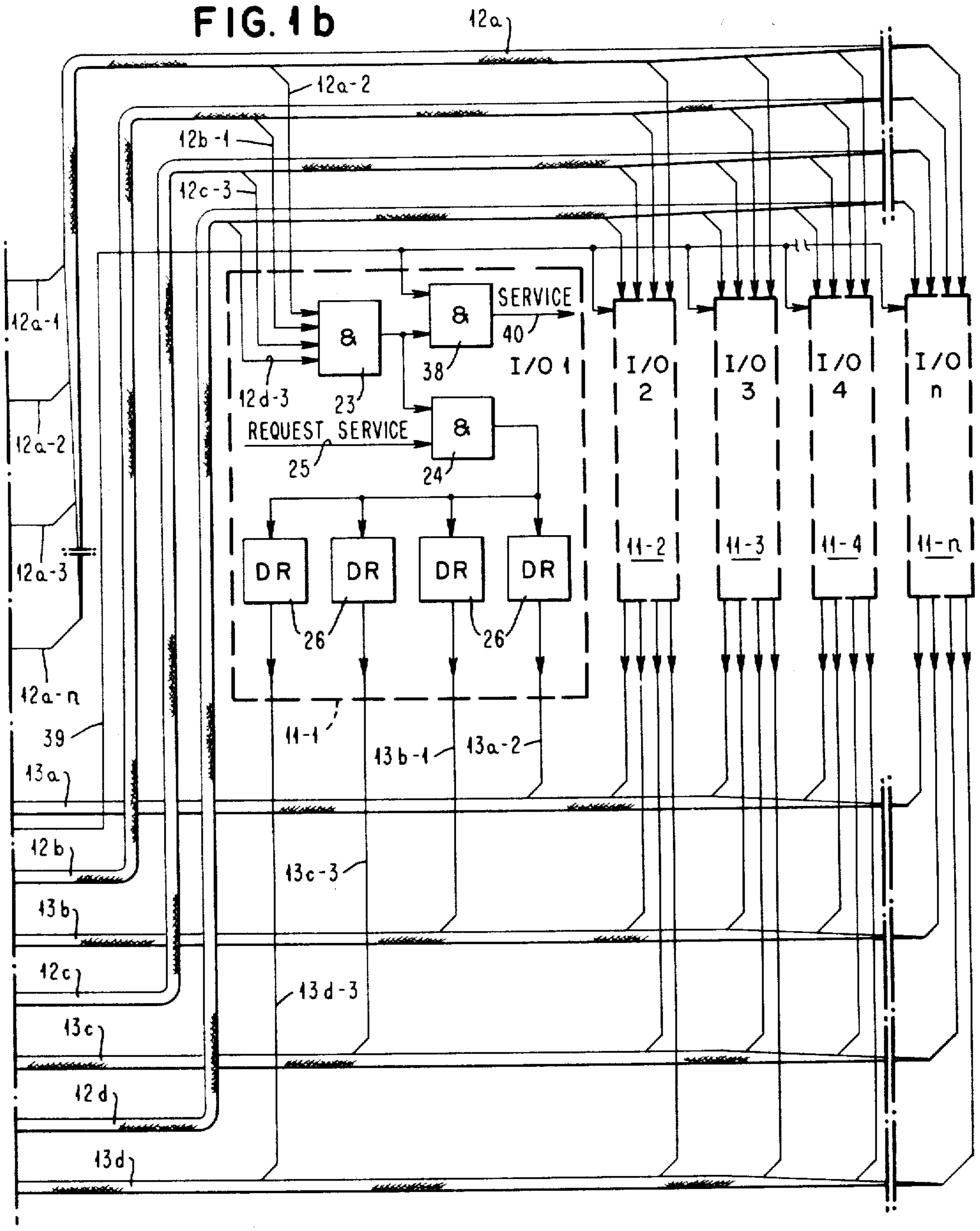

Other and further objects and advantages of the invention will become apparent from the detailed description which follows when taken in conjunction with the accompanying drawings in which:

FIGS. 1*a* and 1*b* arranged as in FIG. 1 show the components and electrical circuit arrangement of a data input-out device polling system embodying the present invention in a particular form thereof.

The representative polling system shown in FIGS. 1*a* and 1*b* as embodying the present invention includes a central polling source 10 and a plurality of outlying data input-output devices 11–1, 11–2, 11–3, and 11–4 through **11–*n*. The source 10 is coupled to the data input-output devices through ordered sets of digit address selection output lines, shown by way of example as four in number enabling input-output device selection on the basis of a four digit address. These ordered sets of address lines include a first-order set 12*a*, a second-order set 12*b*, and third-order and fourth-order sets 12*c* and 12*d*. The data input output devices 11–1—11–*n* are similarly coupled to the central polling source 10 through ordered sets of digit address input lines corresponding in number to the number of sets of output lines and including a first-order set 13*a*, a second-order set 13*b*, and third-order and fourth-order sets 13*c* and 13*d***.

The central polling source 10 includes a first-order digit address selection unit **14*a* having circuit components and a circuit arrangement more fully described hereinafter, and includes similarly constructed and arranged second-order, third-order and fourth-order digit address selection units 14*b*, 14*c*, and 14*d*, respectively. Each of the input-output devices 11–2–11–*n* includes address responsive and service request circuit components and a circuit arrangement similar to that shown for the input-output device 11–1** and more fully described hereinafter.

The digit address selection units of the central polling source 10 operate under timing control of a ring counter 16 having successively operated control stages 16–1—16–6. A polling operation is initiated by applying to an input circuit P of the polling source 10 a polling signal generated in conventional manner by the central data processing equipment (not shown) when the latter is available to translate data to or from the input-output devices. This signal turns ON a trigger 15, and concurrently sets the ring counter stage 16–1 ON and the ring counter stages 16–2—16–6 OFF. The trigger 15 thereupon initiates operation of a clock C, which operates during the ON period of the trigger 15 to supply advance pulses to the counter 16, and conditions one input circuit of an AND gate 17 (having a second input circuit conditioned at this time in a manner presently to be explained) to supply energization through a plurality of OR units 18–1—**18–*n* and associated driver stages 19–1—19–*n* to each of the first order address selection output line conductors 12*a*–1—12*a*–*n* of the first order line set 12*a*. The line conductors 12*a*–1—12*a*–*n*** provide *n* different individual values of the first-order address digit, and the concurrent energization of the line conductors of the line set **12*a* effects polling of the first order digit of all input-output device address in a manner presently to be considered more fully. The ON state of the trigger 15 similarly supplies energization through the corresponding AND gate and OR units and drivers of the address selection units 14*b*–14*d* to all of the selection output line conductors of the second, third and fourth address line sets 12*b*–12*d***. The line conductors of each of these line sets likewise provide *n* different individual values of a corresponding order of the input-output device address digit, and the concurrent energization of all of these line conductors effects polling of the second-order, third-order and fourth-order digits of all input-output device addresses. Thus all input-output devices are poll-addressed concurrently at this time.

As more particularly shown for the input-output device 11–1, each such device includes an AND gate 23 which comprises an address responsive means and is conditioned by one address line conductor selected from each of the address line sets **12*a*–12*d*. The particular conductor selected from each line set to condition the AND gate 23 establishes the individual address of the particular input-output device. Suppose, for example, that the AND gate 23 of the device 11–1 is conditioned by the conductor 12*a*–2 of the address line set 12*a*, by a conductor 12*b*–1 of the set 12*b*, by a conductor 12*c*–3 of the set 12*c*, and by a conductor 12*d*–3 of the set 12*d***. The address assigned to this input-output device is then 2133, and will be selected to be different from the address assigned to any other of the input-output devices. By this method of address line selection, there is no general requirement that all address lines be available at each input-output device. Thus in the general case where input-output devices may be widely scattered geographically only the address line conductors selected for the address of a given input-output device need extend to this device.

By reason of the concurrent energization of all address line conductors as earlier described, the AND gate 23 of the input-output device 11–1 (and the corresponding AND gate 23 of all other input-output devices) is fully energized and conditioned to energize one input circuit of an AND gate 24. Each input-output device requiring service generates in conventional manner and applies a request service signal to a second input circuit 25 of the AND gate 24. This request service signal conditions the AND gate 24 to supply energization through individual ones of a plurality of drivers 26 to individual input line conductors of the input line sets **13*a*–13*d*, which conductors are preferably selected to correspond in address digit value to those of the output lines 12*a*–12*d* which condition the AND gate 23. Thus each input-output device requesting service transmits its address digit values to individual ones of the digit address selection units 14*a*–14*d*. It will be evident that one input line conductor 13*a*–1 of the line set 13*a* has the same digit value as the output line conductor 12*a*–1 of the line set 12*a*, and this input line conductor conditions one input circuit of an AND gate 30–1 as more particularly shown for the first-order digit address selection unit 14*a*. It will also be evident that the remaining input line conductors 13*a*–2—13*a*–*n* likewise have individual digit unit values corresponding to those of the output line conductors 12*a*–2—12*a*–*n* and these input conductors condition an input circuit of an individual AND gate 30–2—30–*n* as shown. Thus, if the input-output unit 11–1 energizes through a driver 26 a digit valued conductor 13*a*–2 of a line set 13*a*, this energized line conductor will condition one input circuit of the AND gate 13–2 corresponding to the energized output conductor 12*a*–2 which effected partial conditioning of the address AND gate 23 of the input-output unit 11–1. The AND gates 30–1—30–*n* each has a second input circuit, and these are initially concurrently energized by an AND gate 31 which is conditioned by the ON state of the trigger 15, by the ON state of the stage 16–1 of the counter 16, and by an inverter 32 responsive through an OR unit 33 to the OFF state of all of a plurality of triggers 34–1—34–*n***.

Each input-output device which responds to the address polling, and requests service by energizing a digit valued input line of the line set **13*a*, causes a corresponding one of the AND gates 30–1—30–*n* to be fully conditioned and thereby effect turn ON of a corresponding one of the triggers 34–1—34–*n*. Several input-output devices may energize the same digit valued input line which effects turn ON of the same trigger, and several input-output devices in concurrently responding to the address polling may effect turn ON of several of these triggers so that the input addresses are stored by the triggers on a composite basis according to prevailing common digit values within each digit order. The ON state of any trigger supplies energization through the OR unit 33 to the inverter 32** which thereupon deconditions the AND gate 31 and thereby deconditions all of the AND gates 30-1—30-n. Thus any input-output device which later responds to the address polling while it is in progress is prevented from later turning ON any one of the triggers 34-1—34-n.

The trigger 34-1 in its ON state conditions one input circuit of an AND gate 35-1, and through an inverter 36-1 deconditions an input circuit of each of a plurality of AND gates 35-2—35-n. The trigger 34-2 when ON conditions one input circuit of the AND gate 35-2 and through an inverter 36-2 deconditions one input circuit of each of the AND gates 35-3—35-n. Similarly, the trigger 34-3 when turend ON conditions one input circuit of the AND gate 35-3 and through an inverter 36-3 deconditions an input circuit of all remaining AND gates including the AND gate 35-n. The ON state of the trigger 34-n only conditions one input circuit of the AND gate 35-n. Thus if the triggers 34-1—34-n be considered to be arranged in order of decreasing first-order address digit values, it will be evident that turn ON of any trigger effects conditioning of one input circuit of the corresponding AND gate 35-1—35-n of the same order of digit value and concurrently effects deconditioning of an input circuit of all other such AND gates of lesser digit value. For example, if the input-output device 11-1 requests service by energizing its input conductor 13a-2 to effect turn ON of the trigger 34-2 through the AND gate 30-2, and if it be assumed that the trigger 34-1 remains OFF at this time while the trigger 34-3 is turned ON by some other input-output device requesting service, only the AND gate 35-2 is conditioned by the ON state of the trigger 34-2 but the AND gate 35-1 is not conditioned by reason of the assumed OFF state of the trigger 34-1 and all of the remaining AND gates 35-3—35-n are deconditioned through the inverter 36-2 by reason of the ON state of the trigger 34-2. Accordingly the AND gate 35-3 cannot be fully conditioned at this time even though its associated trigger 34-3 has been turned ON under the assumed conditions.

All of the AND gates 35-1—35-n have a second input circuit, and these input circuits are concurrently conditioned by the ON state of the trigger 15. The one of these AND gates which has been conditioned by its associated trigger 34-1—34-n thus is fully conditioned at this time and energizes one of the line conductors 12a-1—12a-n through an associated OR unit 18-1—18-n and associated driver 19-1—19-n. At the same time, the now energized inverter 32 deconditions the AND gate 17 to terminate concurrent energization of the OR units 18-1—18-n by the latter. Thus only the one line conductor 12a-1—12a-n which is energized by the fully conditioned one of the AND gates 35-1—35-n thereafter remains energized, and no other one of these line conductors can be concurrently energized at this time since no other one of the AND gates 35-1—35-n is fully conditioned. It will accordingly be evident that the operation of the address selection unit 14a effects selection of the first-order address digit value corresponding to the first-order digit of the address of all input-output devices requesting service. It does this on a first-come/first-served basis and by priority according to decreasing digit values of the addresses assigned to the input-output devices. The output line energization selection of one first-order address digit value maintains fully conditioned the address AND gates 23 of all input-output devices having this first-order digit value in their address. Since all other first-order output lines of differing digit value are deenergized by the selection unit 14a, all input-output devices which request service but which do not include the selected first-order digit value in their address now have their address AND gate 23 deconditioned and accordingly terminate further transmission of their service-request address to the digit address selection units 14a-14d.

The first advance pulse supplied by the clock C turns

OFF the counter stage 16-1 and turns ON the counter stage 16-2. The selection of the second-order address digit by the selection unit 14b is now accomplished in the same manner as that just described and leaves energized one output circuit conductor of the line set 12b. The next advance pulse of the clock C turns off the counter stage 16-2 and turns ON the stage 16-3. The third-order digit address selection unit 14c selects the third-order address digit and leaves one conductor of the line set 12c energized. In similar manner the next advance pulse of the clock C in turning OFF the counter stage 16-3 and turning ON the counter stage 16-4 causes the selection of the fourth-order address digit by the fourth-order digit address selection unit 14d to complete the address selection of a particular input-output device upon turn OFF of the counter stage 16-4 and turn ON of the counter stage 16-5 by the next clock advance pulse. The selected input-output device remains with its address AND gate 23 fully energized by this selection. This fully conditioned AND gate of the selected input-output device energizes one input circuit of an AND gate 38. The latter has a second input circuit which is conditioned, in common with that of a similar AND gate in all other input-output devices, through a control circuit 39 from the now ON counter stage 16-5. Full conditioning of the AND gate 38 generates in its output circuit 40 a service signal which is used in conventional manner by the selected input-output device to condition it to perform the input or output operation for which it requested service.

The next advance pulse of the clock C turns OFF the counter stage 16-5 and turns ON the stage 16-6. The latter through a reset circuit 41 now resets the trigger 15 OFF to stop the clock C, and concurrently resets OFF any of the triggers 34-1—34-n of the selection unit 14a (and corresponding triggers of the units 14b-14d) which may have been turned ON during the selection operation. This places the polling system in readiness for the next polling operation. The output and input address lines may now under conventional AND gate control be made available for other purposes during the operational interval of the selected input-output device.

While the particular form of polling system above-described accomplishes selection of a particular input-output device in four sequential address selection steps, it will be understood that a lesser or greater number of selection steps may be employed according to the particular application. Each application also will determine the number of input-output address line conductors in each line set. For example, four sets of address lines having ten conductors each will enable selection of a total of 10,000 input-output devices each having an assigned unique four line address utilizing one address line from each of the four sets. In contrast, an application involving a smaller polling system may utilize only a two-step address selection by use of only two sets of input and output address lines each having eight conductors and thus enabling selection of any of 64 input-output devices.

It will be apparent from the foregoing description of the invention that a polling system embodying the invention has the advantage of minimizing the complexity of polling equipment and the number of line conductors required to effect rapid selection for servicing of each of plural input-output devices. The system of the invention permits substantially faster poll selection of an input-output device than is available in the serial method of polling, yet substantially reduces the amount of hardware and line complexity required for direct address selection of a particular one of plural devices concurrently registering requests for service. A polling system embodying the invention has the further advantage that it is readily adapted to expansion or contraction of system size by modular steps according to the prevailing nature and size of the central data processing equipment with which it is employed and the prevailing number of data input-output devices used in each particular application.

The system thus allows a high degree of flexibility in choice of the relative balance as between the amount of polling hardware used at the central data processing location and that used at each input-output device and the choice of the number of address lines selected for each system installation. It will be evident that the present polling system in concurrently polling all input-output devices enables quite rapid selection of one such device for servicing with little or no time dependence upon the number of input-output devices employed in a particular installation.

While there has been described herein one form of the invention for purposes of illustration, it is contemplated that numerous changes may be made without departing from the spirit of the invention.

What is claimed is:

1. A polling system for data input-output devices comprising polling means adapted to supply individually and collectively output polling addresses each comprised by a group of electrical signals having individual preselected signal orders and preselected interorder values to provide an individual distinctive address, a plurality of address means each jointly responsive to an individual distinctive group of address signals supplied by said polling means and to actuation by a service-request signal of an input-output device individual thereto for supplying to said polling means an input group of electrical address signals having group orders and intergroup values individual to and distinctively identifying said each address means, means for controlling said polling means concurrently to poll all of said address means by supplying to each thereof a group of electrical signals distinctive of the individual address thereof, and to terminate each polling operation in successive address signal order steps, and selection means included in said polling means and responsive to the composite of all input address signals concurrently supplied to said polling means by all actuated ones of said address means during concurrent polling thereof for following each signal order step of polling operation by selecting and continuing the supply to said address means of an output address signal individually selected upon the basis of a composite interorder value of input address signals within each of successively selected composite signal orders thereof.

2. A polling system according to claim 1 in which said selection means includes means responsive to said input address signal on a composite basis for storing the prevailing common individual interorder input signal values within each input signal order and for utilizing the stored signal values by successive signal orders to effect said selection and continued supply of each said output address signal.

3. A polling system according to claim 1 in which the address signal interorder values within each said signal order have decreasing priority value from a first to a last thereof, and in which said selection means includes means for effecting said selection and continuing supply of said output address signals by individual selection of said signals from highest to lowest priority value and by selection premised upon the highest prevailing priority composite interorder value within each said composite signal order.

4. A polling system according to claim 3 in which said selection means includes means responsive to selection of the highest prevailing composite interorder priority value output address signal for preventing selection of all lesser composite interorder priority value signals.

5. A polling system according to claim 1 in which each said address means includes means for suppling to said polling means an input group of electrical address signals having group orders and intergroup values identical to the group orders and intergroup values of the group of output address signals to which said each address means is responsive.

6. A polling system according to claim 1 in which said polling means includes timing means providing successive time intervals, and in which the successive selection of said individual output address signals supplied by said selection means is effected at individual successive timing intervals by timing control exerted over said selection means by said timing means.

7. A polling system according to claim 6 in which the completion of selection by said selection means of said output address signals identifies selection thereby of an individual address means, and said timing means includes means operative during a terminal time interval for effecting the supply to said selected address means of a signal indicating selection for service of the input-output device individual thereto.

8. A polling system according to claim 1 in which said polling means is coupled to said plurality of address means by output order sets of interorder priority valued address lines energizable to provide by selective coupling of said each address means to an individual line within each set thereof said group of address signals distinctively identifying said each address means, and in which said each address means supplies to said polling means a group of individual address signals established by address-means energization of individual interorder priority valued input address lines included in each plural input order sets thereof.

9. A polling system according to claim 8 in which said polling means includes means for concurrently polling all of said address means by concurrently energizing all of said output address lines of all said sets thereof.

10. A polling system according to claim 9 in which each actuated address means includes means responsive to said concurrent polling for energizing an input address line in each order set thereof corresponding to the individual output line in each of the ordered sets thereof through which said address signals are supplied to said each address means by said polling means.

11. A polling system according to claim 10 in which said selection means includes means responsive to the energized input lines in each set thereof to select for maintained energization one ouput address line in each set thereof corresponding to a selected energized input line in each set thereof.

12. A polling system according to claim 10 in which said polling means includes sequential timing means, and in which said selection means is controlled by said timing means to select in each of successively selected line sets one output address line to be maintained energized.

13. A polling system according to claim 12 in which said selection means includes means responsive to the interorder priority value of said energized input lines to select for maintained energization an output address line in each set thereof corresponding to the highest priority valued one of the energized input lines in each set thereof.

References Cited

UNITED STATES PATENTS

| | | | |
|---|---|---|---|
| 3,308,443 | 3/1967 | Couleur et al. | 340—172.5 |
| 3,333,252 | 7/1967 | Shimabukuro | 340—172.5 |
| 3,336,582 | 8/1967 | Beausoleil et al. | 340—172.5 |

ROBERT C. BAILEY, *Primary Examiner.*

R. B. ZACHE, *Assistant Examiner.*